United States Patent
Tashima

(10) Patent No.: US 6,567,178 B2
(45) Date of Patent: *May 20, 2003

(54) FAX MAIL APPARATUS

(75) Inventor: Hirotaka Tashima, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/602,634

(22) Filed: Feb. 16, 1996

(65) Prior Publication Data

US 2003/0043403 A1 Mar. 6, 2003

(30) Foreign Application Priority Data

Aug. 7, 1995 (JP) ............................................. 7-200822

(51) Int. Cl.⁷ ................................................. H04N 1/00
(52) U.S. Cl. ...................... 358/1.15; 358/402; 358/407; 358/442
(58) Field of Search .............................. 358/402, 403, 358/407, 440, 468; 379/97, 98, 100, 93.24, 100.08, 100.09; 395/114, 200.5, 200.6, 200.9; H04N 1/32

(56) References Cited

U.S. PATENT DOCUMENTS

| 5,014,300 A | * | 5/1991 | Harvath et al. | ........ 379/100.09 |
| 5,018,191 A | * | 5/1991 | Catron et al. | .......... 379/100.09 |
| 5,146,488 A | * | 9/1992 | Okada et al. | ................ 358/402 |
| 5,170,428 A | * | 12/1992 | Watanabe et al. | ...... 379/100.09 |
| 5,257,112 A | * | 10/1993 | Okada | ........................ 358/402 |

(List continued on next page.)

FOREIGN PATENT DOCUMENTS

| JP | 05-037552 | 2/1993 |
| JP | 05-048794 | 2/1993 |
| JP | 05-122417 | 5/1993 |

*Primary Examiner*—Madeleine Nguyen
*Assistant Examiner*—Joseph R. Pokrzywa
(74) *Attorney, Agent, or Firm*—Katten Muchin Zavis Rosenman

(57) ABSTRACT

A FAX receiving unit is an interface with the call originating FAX. A delivery management table is stored with a service code for designating a kind of a FAX mail service and a condition requested by the call originating FAX and also a telephone number of the destination FAX. A service subscriber table records the telephone number and the FAX-ID for every subscriber. A message accumulation unit stores the FAX message and the FAX-ID of the call originating FAX. A service control unit registers the delivery management table with the service code and the telephone number of the destination FAX received by the FAX receiving unit from a transmitting FAX and accumulates the FAX message and the FAX-ID of the call originating FAX in the message accumulation unit. The service control unit acquires a corresponding FAX-ID by retrieving the service subscriber table on the basis of the destination FAX telephone number of which the call originating FAX notifies and replies it to the call originating FAX. The service control unit, when the condition of the service code is satisfied, originates a call to the destination FAX and transmits the FAX message and the FAX-ID of the call originating FAX which have been stored in the message accumulation unit.

2 Claims, 10 Drawing Sheets

U.S. PATENT DOCUMENTS

| | | | |
|---|---|---|---|
| 5,299,255 A | * 3/1994 | Iwaki et al. | 358/402 |
| 5,339,156 A | * 8/1994 | Ishii | 358/402 |
| 5,367,564 A | * 11/1994 | Sutoh et al. | 379/100.09 |
| 5,392,336 A | * 2/1995 | Chang et al. | 379/100.11 |
| 5,404,231 A | * 4/1995 | Bloomfield | 358/400 |
| 5,410,416 A | * 4/1995 | Amberg et al. | 358/405 |
| 5,448,626 A | * 9/1995 | Kajiya et al. | 379/67 |
| 5,459,584 A | * 10/1995 | Gordon et al. | 358/407 |
| 5,508,817 A | * 4/1996 | Kunigami | 358/407 |
| 5,552,901 A | * 9/1996 | Kikuchi et al. | 358/468 |
| 5,619,725 A | * 4/1997 | Gordon | 710/19 |
| 5,644,404 A | * 7/1997 | Hashimoto et al. | 358/402 |
| 5,694,458 A | * 12/1997 | Okada et al. | 358/402 |
| 5,724,156 A | * 3/1998 | Satou | 358/407 |
| 5,802,314 A | * 9/1998 | Tullis et al. | 709/246 |
| 5,881,136 A | * 3/1999 | Tasker et al. | 379/100.09 |
| 5,892,587 A | * 4/1999 | Okada et al. | 358/402 |
| 6,088,126 A | * 7/2000 | Khouri et al. | 358/407 |

* cited by examiner

FIG. 2

HEADER PART: CALL ORIGINATING FAX-ID, THE NUMBER OF PAGES, PAPER SIZE, CODING METHOD, ETC.

DATA PART: FAX MESSAGE CODED DATA

FIG. 10
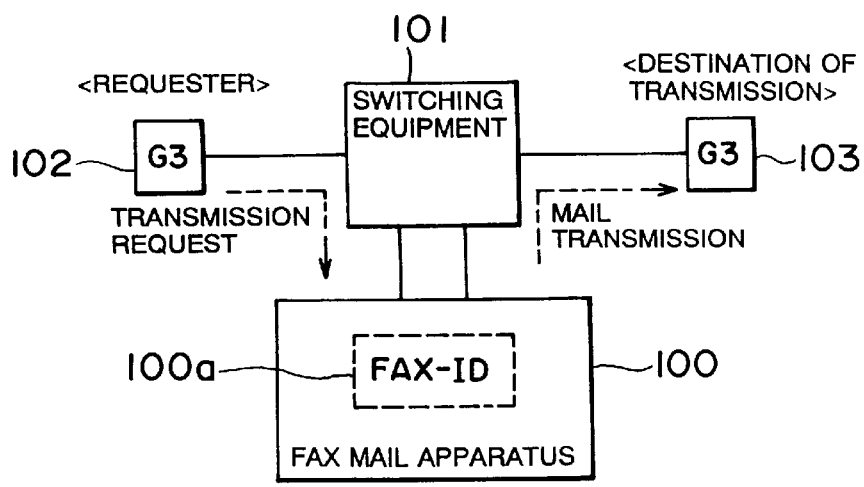
FIG. 11
STEP 1:
STEP 2:
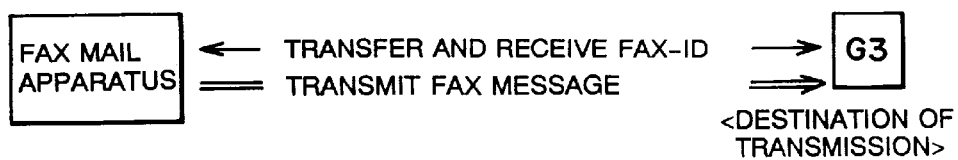

us 6,567,178 B2

FAX MAIL APPARATUS

BACKGROUND OF THE INVENTION

1. Field of the Invention

The present invention relates to a FAX mail apparatus which receives and temporarily accumulates FAX messages (FAX message coded data) transmitted from a facsimile device (hereinafter abbreviated to [FAX]) on a transmitting side and which transmits the FAX message to a destination FAX device in accordance with a predetermined condition.

2. Description of the Related Art

A FAX mail apparatus for implementing a FAX mail service has hitherto been used. This FAX mail apparatus 100 is, as illustrated in FIG. 10, connected as a terminal to a switching equipment 101 which consists a part of communication network. The FAX mail apparatus 100 performs communications with a call originating FAX 102 and a destination FAX 103 according to a G3 FAX communication protocol and implements a variety of FAX mail services. The services actualized by this FAX mail apparatus 100 are, specifically, a "time designated service" for delivering the FAX message transmitted from the call originating FAX 102 to the destination FAX 103 at a time designated by a requester, a "broadcasting service" for simultaneously delivering the FAX message transmitted from the call originating FAX 102 to a plurality of destination FAXes 103 and a "confidential service" for delivering the FAX message transmitted from the transmitting FAX 102 to only an individual showing a predetermined password, etc.

FIG. 8 shows procedures in the case of requesting such FAX mail services. As illustrated in FIG. 8, a service requester executes dialing from a one's FAX device (call originating FAX) 102 to the FAX mail apparatus 100 ((1)). When a connection response to this dialing is given from the FAX mail apparatus 100, the service requester gives a designation of the service to the FAX mail apparatus 100 by a PB signal (Push Button Tone Signal), etc. ((2)). Items of data transmitted with this service designation are, for example, a subscriber's ID of the service requester and a password corresponding thereto which are registered beforehand in the FAX mail service, service codes (including a delivery time in the case of the time designated service and also the password of an individual receiving the delivery in the case of the confidential service) indicating a kind of the FAX mail service, destination designating codes (a telephone number of the destination FAX 103 or a broadcasting list number in the case of the broadcasting service), and so on.

The FAX mail apparatus 100 receiving those service designations performs a mail accepting process ((3)). More specifically, the FAX mail apparatus 100 checks whether or not a combination of the subscriber's ID and password contained in the service designation is previously registered as that of the service subscriber's own. Then, if registered, the service codes and the destination designating codes are stored therein. After completing the above processes, the FAX mail apparatus 100 transmits a service accept guidance to the call originating FAX 102 ((4)). This service accept guidance is a voice data informing the service requester of a message such as "Set FAX in the transmitting status, please."

When the service requester sees the text display of this service accept guidance and pushes a start button of the call originating FAX 102, the G3 FAX communication protocol is started ((5)). FIG. 9 illustrates a detail of this G3 FAX communication protocol.

As shown in FIG. 9, in an initial phase A of the G3 FAX communication protocol, call setting is carried out. That is, the transmitting-side FAX (the call originating FAX 102 in this case) transmits a calling tone (CNG) to the receiving-side FAX (the FAX mail apparatus 100 in this case), and the receiving-side FAX transmits a called station identification (CED) to the transmitting side FAX.

In a next phase B, pre-message procedures are conducted. That is, the receiving-side FAX transmits called subscriber identification (CSI), non-standard facilities (NSF) and a digital identification signal (DIS) to the transmitting-side FAX. This item of called subscriber identification (CSI) indicates a FAX-ID of the receiving-side FAX by use of characters ("+", 0–9, blank) of 20 digits at the maximum. The non-standard facilities (NSF) is used for a non-standard protocol and available for, e.g., supporting the FAX-ID containing Kana (Japanese syllabary) and Kanji (Chinese character) that can be used in common by machines of the same maker. The digital identification signal (DIS) is data for indicating standard capabilities (a paper size, a communication speed, etc.) of the receiving-side FAX. Next, the transmitting-side FAX transmits transmitting subscriber identification (TSI), non-standard facilities set-up (NSS) and digital command signal (DCS) to the receiving-side FAX. This item of transmitting subscriber identification (TSI) is data for indicating, as in the same way with the data CSI, a FAX-ID of the transmitting-side FAX. The non-standard facilities set-up (NSS) is used for, as in the same way with the data NSF, the non-standard protocol and available for, e.g., supporting the FAX-ID containing Kana and Kanji that can be used in common by machines of the same maker. The digital command signal (DCS) is a digital setting instruction responding to the signal DIS. Thus, when each FAX obtains a FAX-ID of the other FAX, the receiving-side FAX transmits a confirmation to receive (CFR).

In a next phase C, the message is transferred. That is, the transmitting-side FAX transmits the FAX message to the receiving-side FAX. Further, in subsequent phases D and E, post-processing is to be executed.

The FAX-IDs are transferred and received by implementing the above G3 FAX communication protocol ((6)), and the FAX message (image data) is transmitted ((7)). Then, the FAX mail apparatus 100 executes a process of accumulating the FAX messages ((8)). That is, till the process is shifted to an implementation of the above FAX mail service, the FAX messages are held in the FAX mail apparatus 100. Note that such FAX mail service procedures can be simplified in terms of the operation by making use of special numbers if the switching equipment 101 cooperates with the FAX mail apparatus 100.

Incidentally, if a condition which is specified by the service designation (service codes, destination designating codes) stored in the FAX mail apparatus 100 is satisfied, the FAX mail apparatus 100 delivers the FAX message to the destination FAX 103. This FAX message is delivered according to the G3 FAX communication protocol shown in FIG. 9, wherein the FAX mail apparatus 100 behaves as a transmitting-side FAX while the destination FAX 103 behaves as a receiving-side FAX.

Thus, in the FAX mail service, as shown in FIG. 11, the FAX message is transmitted by two communication steps, i.e., a communication step (step 1) between the call originating FAX 102 and the FAX mail apparatus 100 and a communication step (step 2) between the FAX mail apparatus 100 and the destination FAX 103.

By the way, when ordinary FAXes perform the FAX communication with each other according to the above G3

FAX communication protocol, FAX-IDs are transferred and received between the transmitting-side FAX and the receiving-side FAX. Accordingly, the transmitting-side FAX is capable of displaying a telephone number of the receiving-side FAX, a name of a company-and a name of an installed section in which the receiving FAX is installed on a display unit thereof. On the other hand, the receiving FAX is capable of printing a telephone number of the transmitting FAX, a name of a company and a name of an installed section in which the transmitting FAX is installed at an upper or lower edge on a sheet of output paper for the FAX message.

As described above, however, in the FAX mail service using the FAX mail apparatus 100, the FAX message is delivered trough the two communication steps. In each communication step, the FAX mail apparatus 100 behaves as a communication party concerned (transmitting or receiving FAX). Hence, in these respective communication steps, a FAX-ID 100a set as a fixed value when installing the FAX mail apparatus 100 is transmitted to the counter side FAX device (the call originating FAX 102 in step S1 and the destination FAX 103 in step 2). Note that the individual step is separate from other communications steps, and hence the FAX-ID used in each individual communication step is normally closed within that communication step and is not transferred to other communication steps at all.

For this reason, only the FAX-ID of the FAX mail apparatus 100 is printed on the output paper for the FAX message from the destination FAX 103. Accordingly, if the transmitter omits writing of one's name to the FAX message in expectation of printing the FAX-ID, the transmitter cannot be absolutely specified on the destination side. Further, in the case of performing a FAX receiving management based on the FAX-ID printed on the output paper for the FAX message, the transmitter can not be specified from this FAX-ID, and consequently the FAX receiving management becomes troublesome.

Also, when the number of received FAX messages reaches a predetermined number, they are listed in a receiving management list and then outputted from the FAX. However, if the FAX-ID is fixed in the FAX mail apparatus 100 but is not of the call originating FAX 102, the call originating FAX 102 can not be specified. Therefore, it follows that this receiving management list is meaningless.

Further, in the call originating FAX 102 also, only the FAX-ID fixed in the FAX mail apparatus 100 is displayed on the display unit, and it is impossible to confirm whether destination designating code inputted in the service designation is correct or not.

It is to be noted that such a problem arises also in the case of performing the busy intercepting service and the unattended intercepting service by use of the FAX mail apparatus 100. The busy intercepting service and the unattended intercepting service are services that the FAX mail apparatus 100 and the switching equipment 101 cooperate to implement. That is, in this busy intercepting service, the FAX message is transmitted to the FAX mail apparatus 100 by the switching equipment 101 automatically switching over the line when the destination FAX 103 is busy, and the FAX messages accumulated in the FAX mail apparatus 100 are automatically delivered to the destination FAX 103 after a given time has elapsed. Further, in the unattended intercepting service, if the destination FAX 103 does not respond during a preset time, the switching equipment 101 automatically switches over the line to transmit the FAX message to the FAX mail apparatus 100, and, after the given time has elapsed, the FAX messages accumulated in the FAX mail apparatus 100 are automatically delivered to the destination FAX 103.

In the above busy intercepting service and unattended intercepting service, the FAX messages are delivered in the two communication steps. Then, in each communication step, the FAX mail apparatus 100 behaves ase the communication party concerned (transmitting or receiving FAX), and, therefore, it follows that the FAX-ID 100a of the FAX mail apparatus 100 is transmitted to the counter side FAX device. Accordingly, the same problems as the above-mentioned arise.

Further, for the case that the FAX mail apparatus 100 is not connected to the destination FAX even trying to deliver the FAX message as the busy intercepting service or the unattended intercepting service, the management FAX may be installed on the side of a communication network operation managing party for receiving the FAX message and for sending back the output paper for the FAX message to the sending party through off-line. In such a case, if the FAX-ID is not printed on the output paper for the FAX message, there is caused such a problem that a destination to which the output paper is sent back can not be specified.

SUMMARY OF THE INVENTION

It is a first object of the present invention, which was devised to obviate the above problems, to provide a FAX mail apparatus capable of transmitting, when the FAX mail apparatus delivers a FAX message received from a call originating FAX to a destination FAX, a FAX-ID of the call originating FAX to the destination FAX.

It is a second object of the present invention to provide a FAX mail apparatus capable of transmitting, when the FAX mail apparatus receives a FAX message destined to other FAX from the call originating FAX, a FAX-ID of the destination FAX of this FAX message to the call originating FAX.

It is a third object of the present invention to provide a FAX mail apparatus capable of transmitting, when the FAX mail apparatus delivers a FAX message received from the call originating FAX to a management FAX, a FAX-ID of the call originating FAX to the management FAX.

To accomplish the above first object, according to a first aspect of the present invention, a FAX mail apparatus is connected to a communication network. The FAX mail apparatus temporarily receives a FAX message. transmitted from a call originating FAX and transmits the FAX message to a destination FAX in accordance with a predetermined condition. The FAX mail apparatus comprises a call originating FAX-ID storage unit for storing a FAX-ID of the call originating FAX which has been transmitted from the call originating FAX and a call originating FAX-ID transmitting unit for transmitting the FAX-ID of the call originating FAX which has been stored in the call originating FAX-ID storage unit to the destination FAX instead of a FAX-ID of the FAX mail apparatus itself.

To accomplish the second object, according to a second aspect of the present invention, a FAX mail apparatus is connected to a communication network. The FAX mail apparatus temporarily receives a FAX message transmitted from a call originating FAX and transmits the FAX message to a destination FAX in accordance with a predetermined condition. The FAX mail apparatus comprises a table for previously recording a designating code of the destination FAX and a FAX-ID while relating them to each other, a retrieving unit for acquiring the FAX-ID of the destination FAX that corresponds to the designating code with reference to the table on the basis of the designating code of the destination FAX that has been transmitted from the call originating FAX and a destination FAX-ID transmitting unit for transmitting the FAX-ID of the destination FAX that has been acquired by the retrieving unit to the call originating FAX.

To accomplish the third object, according to a third aspect of the present invention, a FAX mail apparatus is connected to a communication network. The FAX mail apparatus temporarily receives, if a line is not connected for a call of a FAX communication to transmit a FAX message from a call originating FAX to a destination FAX, the FAX message from the call originating FAX that has been transferred through the communication network and transmits the FAX message to the destination FAX after a predetermined time has elapsed. The FAX mail apparatus comprises a call originating FAX-ID storage unit for storing a FAX-ID of the call originating FAX which has been transmitted from the call originating FAX and a call originating unit for originating a call to transmit the FAX message to the destination FAX after a given time has elapsed since the FAX message was received and, if the line is not connected to the destination FAX as a result of this call originating process, originating the call to transmit the FAX message to a management FAX. The FAX mail apparatus further comprises a FAX message transmitting unit for transmitting, if the line is connected to the management FAX as a result of the call originating process by the call originating unit, the FAX message to the management FAX and a call originating FAX-ID transmitting unit for transmitting, if the line is connected to the management FAX as a result of the call originating process by the call originating unit, the FAX-ID of the call originating FAX which has been stored in the call originating FAX-ID storage unit to the management FAX instead of a FAX-ID of the FAX mail apparatus itself.

The FAX mail apparatus, if a line is not connected for a call of a FAX communication from the call originating FAX to the destination FAX, may receive the FAX message from the call originating FAX that has been transferred through the communication network and may transmit the FAX message to the destination FAX after a predetermined time has elapsed. That is, the FAX mail apparatus used for a busy intercepting service and an unattended intercepting service may be available. The "predetermined condition" in this case is that the predetermined time has elapsed since the FAX message was received.

Further, the FAX mail apparatus may service to actualize a FAX mail service. In this case, the above "predetermined condition" may be a condition of transmitting the FAX message to the destination FAX at a time designated by the call originating FAX. That is, it is defined as a time designated service. Further, the above predetermined condition may be a condition of transmitting the FAX message to a plurality of destination FAXes designated by the destination FAX. Namely, it is defined as a broadcasting service. Other than the above, a condition for delivering the FAX message may also be such that the destination FAX presents a password registered beforehand. That is, it is defined as a confidential service.

The FAX-ID stored in the call originating FAX-ID is a piece of call originating FAX identifying data of which the call originating FAX notifies as data TSI or NSS in a G3 FAX communication protocol. This FAX-ID may be a telephone number of the call originating FAX or a name of user of the call originating FAX or a name of section in which the call originating FAX is installed.

The call originating FAX-ID transmitting unit may annex a piece of annex data to the FAX-ID of the call originating FAX and may transmit it to the destination FAX. If constructed in this way, a user of the destination FAX is able to easily understand that the received FAX message is sent via the FAX mail apparatus. This piece of annex data may be a sing such as "+" annexed to a head or a tail of the FAX-ID and may take other forms as long as the annex data can specify at least the call originating FAX.

The FAX-ID of the destination FAX that has been recorded in the table is a piece of destination FAX identifying data of which the destination FAX is notified as data CSI or NSF in the G3 FAX communication protocol. This FAX-ID may be a telephone number of the destination FAX or a name of user of the destination FAX or a name of section where the destination FAX is installed.

The designating code recorded in the table may be a telephone number of the destination FAX. Further, the designating code may be a code for designating a plurality of destination FAXes. In this case, the table records a name which is common to the plurality of destination FAXes as the FAX-ID corresponding to the code for designating the plurality of destination FAXes. Also, the retrieving unit acquires the common name corresponding to the code as the FAX-ID with reference to the table on the basis of the code for designating the plurality of destination FAXes. Further, the destination FAX-ID transmitting unit transmits the common name acquired by the retrieving unit as the FAX-ID to the call originating FAX. If constructed in this way, the transmitter is capable of readily knowing the name common to all the destination FAXes corresponding to the designating code.

The destination FAX-ID transmitting unit may annex a piece of annex data to the FAX-ID of the destination FAX and may transmit it to the call originating FAX. If thus constructed, the call originator is capable of easily understanding that the FAX message will be transmitted via the FAX mail apparatus to the destination FAX. This piece of annex data may be the sign such as "+" annexed to the head or tail of the FAX-ID and may take other forms as long as the annex data can specify at least the destination FAX.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a diagram showing a format of a data file stored in a message accumulation unit of FIG. 1;

FIG. 10 is a diagram illustrating connections in a communication network for performing a conventional FAX mail service; and FIG. 11 is a time arrow diagram showing how the signal is transferred and received when making a request for transmission (step 1) and transmitting a mail (step (2).

DESCRIPTION OF THE PREFERRED EMBODIMENTS

The present invention will hereinafter be discussed by way of embodiments with reference to the accompanying drawings.

(Construction of FAX Mail Apparatus)

Figure 1:
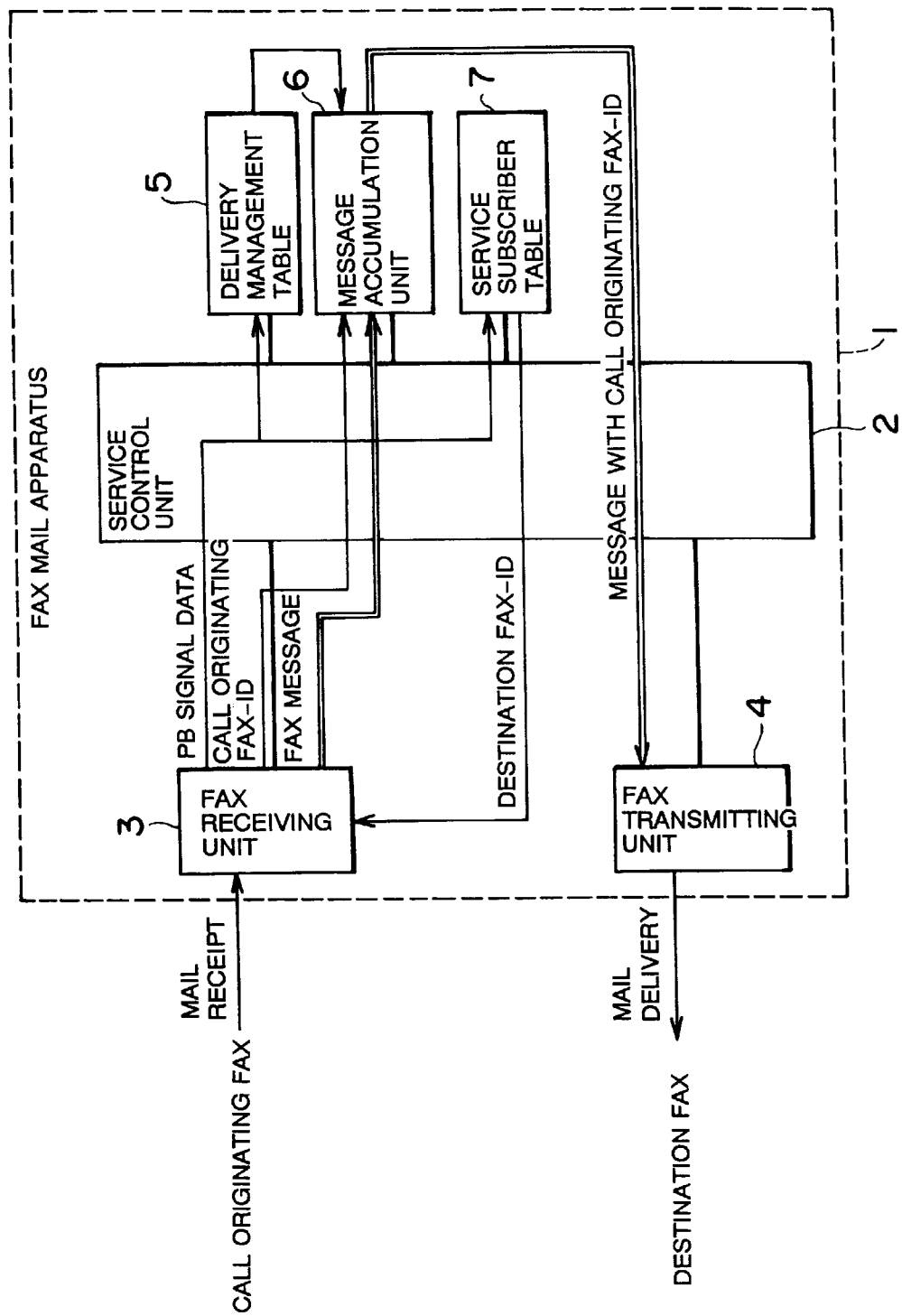
FIG. 1 is a block diagram illustrating a construction of a FAX mail apparatus in accordance with a first embodiment of the present invention.

FIG. 1 is a block diagram illustrating a construction of a FAX mail apparatus through which the present invention is to be embodied. This FAX mail apparatus 1 is also, as in the same way with the prior art, connected to a communication network constructed of a plurality of switching equipments and to a multiplicity of FAXes via this communication network.

As illustrated in FIG. 1, this FAX mail apparatus 1 is constructed of a service control unit 2, a FAX receiving unit 3, a FAX transmitting unit 4, a delivery management table 5, a message accumulation unit 6 and a service subscriber table 7, which are respectively connected to the service control unit 2. Referring to FIG. 1, bold lines for connecting those constructive blocks indicate connecting lines thereof. Referring again to FIG. 1, fine lines and double lines indicate flows of signals transferred between the blocks.

FAX Receiving Unit

The FAX receiving unit 3 incorporates a function of interface with the switching equipment and connected directly to the switching equipment. This FAX receiving unit 3 receives FAX communications from call originating FAXes (FAXes of transmitters in a busy intercepting service and in an unattended intercepting service and a FAX of a service requester in a FAX mail service) via the switching equipment. That is, the FAX receiving unit 3 receives the FAX communications transferred from the switching equipment by way of the busy intercepting service and the unattended intercepting service and also the FAX communications together with the FAX mail service requests that are transmitted via the switching equipment from the call originating FAXes. When receiving those FAX communications, the FAX receiving unit 3 executes a G3 FAX communication control function shown in FIG. 10 in accordance with an instruction given from the service control unit 2. Further, when receiving the FAX communication by way of the FAX mail service, the FAX receiving unit 3 implements also a protocol (that is, service designation receiving ((2)), service guidance transmitting ((4)), etc.) shown in FIG. 9.

Then, the FAX receiving unit 3, when receiving the FAX communication in the busy intercepting service or the unattended intercepting service, detects a dialed telephone number of a destination FAX and then notifies the service control unit 2 of this number. The FAX receiving unit 3 receives a FAX-ID corresponding to this telephone number from the service control unit 2.

Further, the FAX receiving unit 3, when receiving the FAX communication for the FAX mail service, notifies the service control unit 2 of a service designation (a subscriber's ID, a password, a service code and a destination designating code) through PB signals. Then, if the destination designating code contained in the service designation is a telephone number of the destination FAX, the FAX receiving unit 3 receives the FAX-ID corresponding to this telephone number from the service control unit 2. Also, if the destination designating code is a broadcasting list number, the FAX receiving unit 3 receives a name-of-broadcasting-list corresponding to this broadcasting list number from the service control unit 2. It is to be noted that this broadcasting list is a list in which there are listed telephone numbers of all the destination FAXes to which the FAX message should be simultaneously transmitted in the broadcasting service. The broadcasting list number is a serial number of this broadcasting list but is a code for indicating a plurality of destination FAXes. Further, the name-of-broadcasting-list is defined as an ID of this broadcasting list and also a name common to the plurality of destination FAXes to which the FAX message should be simultaneously transmitted.

The FAX receiving unit 3, upon receiving the FAX-ID or the name of broadcasting list from the service control unit 2, transmits the FAX-ID or the name of broadcasting list together with the telephone number or the destination designating code received from the call originating FAX to the transmitting FAX (corresponding to a destination FAX-ID transmitting element).

Corresponding thereto, when the transmitting FAX transmits a its FAX-ID, the FAX receiving unit 3 notifies the service control unit 2 of this FAX-ID. Thereafter, when the call originating FAX transmits the FAX message, this FAX message is transferred to the service control unit 2.

FAX Transmitting Unit 4

The FAX transmitting unit 4 incorporates the function of interface with the switching equipment and is connected directly to the switching equipment. Then, the FAX transmitting unit 4 executes a G3 FAX communication control function shown in FIG. 10 in accordance with an indication given from the service control unit 2.

Subsequently, the FAX transmitting unit 4 calls up the destination FAX and transmits the FAX communication according to an instruction from the service control unit 2. In the transmission of the FAX communication, the FAX transmitting unit 4 receives a telephone number of the destination FAX from the service control unit 2 and effects dialing based on this telephone number. Then, when the FAX-ID is transmitted from the destination FAX, the FAX transmitting unit 4 notifies the service control unit 2 of this FAX-ID, receives the FAX-ID of the call originating FAX from the service control unit 2 and then transmits this FAX-ID of the call originating FAX to the destination FAX (corresponding to a call originating FAX-ID transmitting element). Thereafter, the FAX transmitting unit 4 transfers the FAX message from the service control unit 2 to the destination FAX (corresponding to a FAX message transmitting element). Note that the FAX transmitting unit 4, when the service control unit 2 instructs the FAX transmitting unit 4 to transmit the FAX communication to the management FAX, performs the FAX communication with the management FAX.

Service Control Unit

The service control unit 2 controls the whole FAX mail apparatus 1.

Then, when the FAX receiving unit 3 receives the FAX communication for the busy intercepting service or the unattended intercepting service, the service control unit 2 registers the telephone number of the destination FAX in the delivery management table 5 and obtains a corresponding FAX-ID by retrieving the service subscriber table 7 on the basis of this destination FAX telephone number. Then, the service control unit 2 annexes "+" (annex data) to a head of this FAX-ID and replies it to the FAX communication unit 3. Further, the service control unit 2 registers the effect of being in the busy intercepting service or the unattended intercepting service in the delivery management table 5.

Further, when the FAX receiving unit 3 receives the FAX transmission in the FAX mail service, the service control unit 2 checks whether or not a combination of the password and subscriber ID contained in the PB signals is previously registered in the service subscriber table 7. The service control unit 2, if it is registered, permits the FAX communication subsequent thereto but interrupts, whereas if it is not registered, the FAX communication (mail accepting process). When permitting the FAX communication, the service control unit 2 registers the service codes contained in the PB signals in the delivery management table 5 and also retrieves the service subscriber table 7 on the basis of the destination designating code contained in the PB signals (corresponding to a retrieving element).

Then, when the destination designating code is a telephone number, the service control unit 2 annexes "+" (annex data) to the head of the corresponding FAX-ID read from the service subscriber table 7 and replies it to the FAX communication unit 3. The service control unit 2 also registers the telephone number as the destination designating code in the delivery management table 5. While on the other hand, when the destination designating code is a broadcasting list number, the service control unit 2 reads a corresponding name-of-broadcasting-list and corresponding destination FAX telephone numbers from the service subscriber table 7. The service control unit 2 registers these destination FAX telephone numbers in the delivery management table 5, and replies the name-of-broadcasting-list to the FAX communication unit 3.

Note that if the destination FAX is not registered as a service subscriber, it follows that the FAX-ID of this destination FAX is not registered in the service subscriber table 7, and hence the service control unit 2 does, not reply the FAX-ID.

The FAX control unit 2, when the FAX receiving unit 3 notifies the same unit 2 of the FAX-ID of the call originating FAX, registers it in the message accumulation unit 6. Further, when the FAX receiving unit 3 transfers the FAX massage, the service control unit 2 accumulates the transferred FAX message in the message accumulation unit 6. The FAX control unit 2, after finishing the accumulation of the FAX message and the FAX-ID of the call originating FAX in the message accumulation unit 6, registers the deliver management table 5 with a file name of a data file for storing the FAX-ID and the FAX message in the message accumulation unit 6.

On the other hand, the service control unit 2 always searches the delivery management table 5 and checks whether or not there is a FAX communication satisfying a delivery condition of a service code. The service control unit 2 checks, for example, whether or not there exists such a busy intercepting service or unattended intercepting service that a predetermined time has been elapsed since the receiving time, whether or not there exists a time designated service a designated time of which is reached, whether or not there exists a confidential service for which the password has been transmitted from the destination FAX and whether or not there exists a broadcasting service for which the accumulation of the FAX messages has been completed. Finding out a FAX communication satisfying the condition of the service code as a result of this search, the service control unit 2 retrieves the service subscriber table 7 and checks whether or not a delivery time is designated with respect to the destination FAX of this FAX communication. Then, if the delivery time is designated, but in case this designated time is not yet reached, the service control unit 2 waits as it is.

Then, if the delivery condition of the service code is satisfied and the transmission of the FAX communication is not restricted by the designated time for the destination FAX, the service control unit 2 reads a name of data file and a destination telephone number of the FAX communication from the delivery management table 5. Subsequently, the service control unit 2 reads the data file having this data file name from the message accumulation unit 6. Thereafter, the service control unit 2 notifies the FAX transmitting unit 4 of the telephone number of the destination FAX and causes the FAX transmitting unit 4 to originate a call to the destination FAX (corresponding to a call originating element). As a result of this call originating process, when notified of the FAX-ID of the destination FAX from the FAX transmitting unit 4, the service control unit 2 annexes "+" (annex data) to a head of the FAX-ID of the call originating FAX that is contained in the data file read from the message accumulation unit 6 and notifies the FAX transmitting unit 4 of it. Thereafter, the service control unit 2 sends, to the FAX transmitting unit 4, the FAX message contained in the data file read from the message accumulation unit 6.

It is to be noted that if the communication line is not connected in spite of the originating of the call to the destination FAX, the FAX transmitting unit 4 originates the call again after a predetermined time has elapsed. Such a call re-originating process is repeated within a limit of a predetermined number of times. Further, in the case of the busy intercepting service or the unattended intercepting service, if the line is not connected in spite of performing the call re-originating process the predetermined number of times, the service control unit 2 notifies the FAX transmitting unit 4 of the telephone number of the management FAX and causes the FAX transmitting unit 4 to originate the call to the management FAX (corresponding to a call originating element). The service control unit 2 transmits the FAX message and the FAX-ID of the call originating FAX to the FAX transmitting unit 4 also when the line is connected to this management FAX. In this case also, if the line is not connected to the management FAX, the call re-originating process is repeated within the limit of the predetermined number of times.

Message Accumulating Unit

The message accumulating unit 6 serving as a call originating FAX-ID storage unit is constructed of a hard disk device and stores a multiplicity of data files with respect to a multiplicity of FAX communications. FIG. 2 illustrates a format of each individual data file. As illustrated in FIG. 2, each individual data file is composed of a header part and a data part. This header part is stored with the FAX-ID of the call originating FAX, the number of pages of the FAX message, a paper size and a coding method of the FAX message. Further, the data part is stored with coded data (image data) of the FAX message. Note that a data file name is, as shown in FIG. 6, given to each data file.

Delivery Management Table

Figure 6:
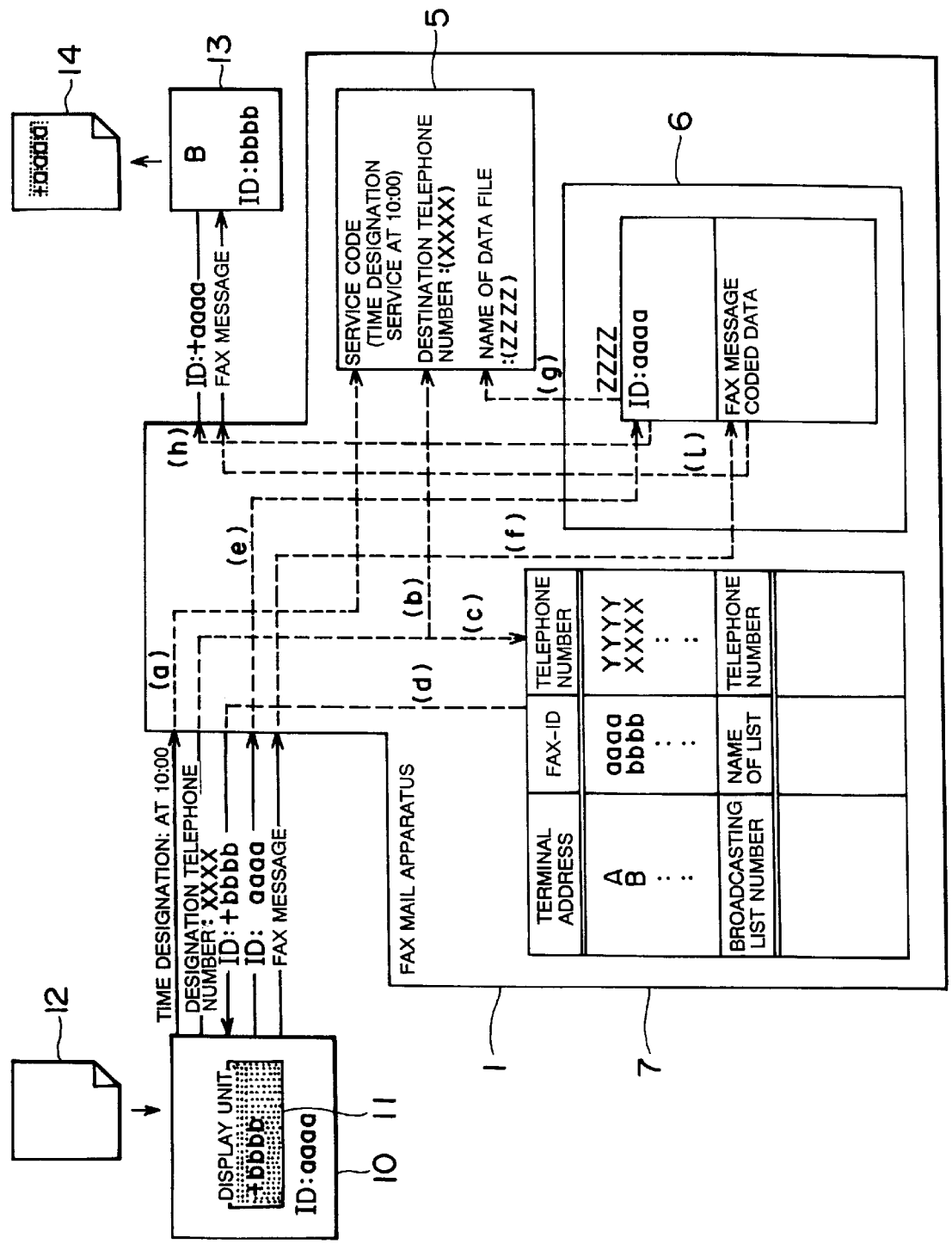
FIG. 6 is an explanatory diagram showing a first example of the FAX transmission using the FAX mail apparatus of FIG. 1.

The delivery management table 5 is defined as a hard disk device and stores, as shown in FIG. 6, a file name of the corresponding data file in the message accumulation unit 6, a destination telephone number and a service code for every FAX communication. In addition to the classification of the service that is the time designated service, the broadcasting service, the confidential service, the busy intercepting service or the unattended intercepting service, the above service code includes a delivery time in the case of the time designated service and a password of the designation FAX in the case of the confidential service.

Service Subscriber Table

The service subscriber table 7 is, as illustrated in FIG. 6, stored with a terminal address of the FAX, a FAX-ID and a telephone number for every service subscriber. Further, for every broadcasting list, the service subscriber table 7 is stored with a broadcasting list number, a list name and a telephone number of each FAX that is contained in a broadcasting group thereof. Also, the service subscriber table 7 is stored with, though an illustration is omitted, a combination of a subscriber's ID and a password and, if a delivery time is designated by a service subscriber,.this designated time for the service subscriber.

(Control Process)

There will be explained a control process executed in the service control unit 2 of the thus constructed FAX mail apparatus 1.

FAX Receiving Process

Figure 3:
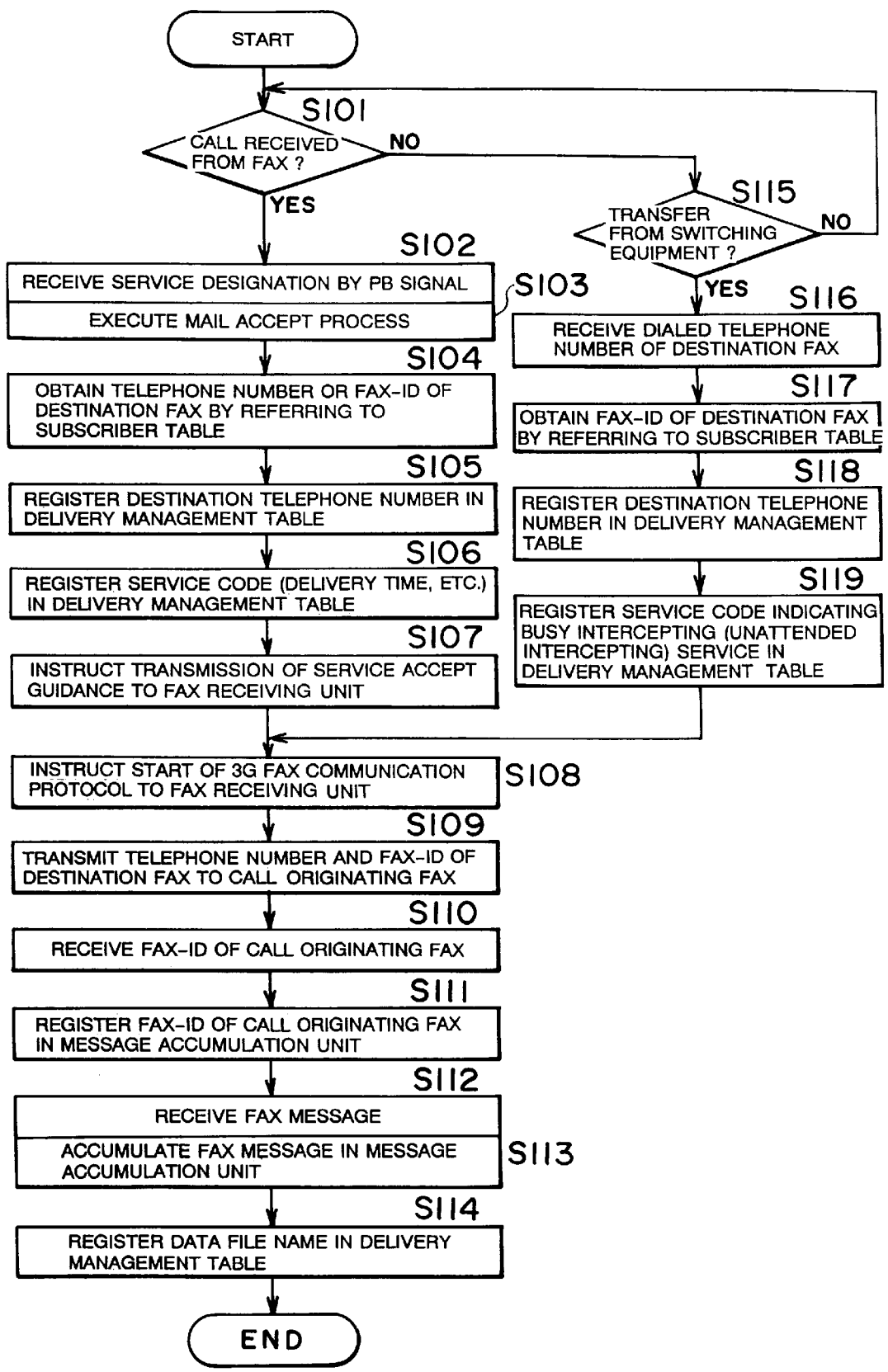
FIG. 3 is a flowchart showing a FAX receiving process executed in a service control unit of FIG. 1.
Figure 5:
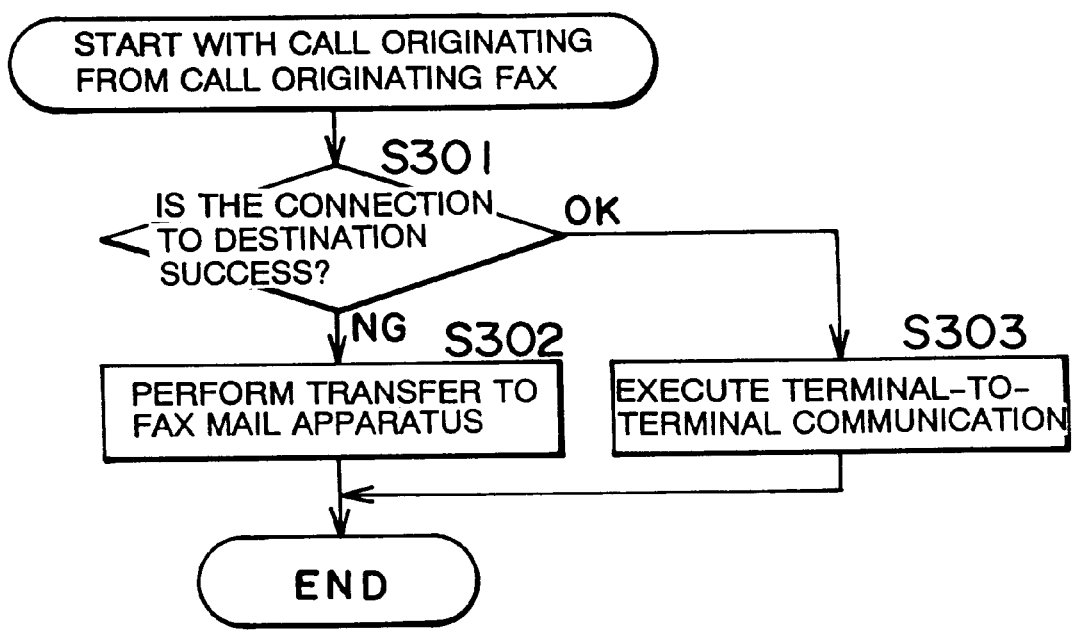
FIG. 5 is a flowchart showing a transfer process for a busy intercepting service and an unattended intercepting service that are implemented in s switching equipment.

FIG. 3 is a flowchart showing the control process executed at the time of receiving the FAX communication. In the flowchart of FIG. 3, the process starts in response to the receiving of the FAX communication with a request for the FAX mail service from one of the FAXes and to the transmission of the FAX communication from the switching equipment for the busy intercepting service or the unattended intercepting service. FIG. 5 is a flowchart showing a flow of processing executed within the switching equipment to transmit the FAX communication in accordance to the busy intercepting service or the unattended intercepting service. This process starts with the switching equipment detecting the call originating from the call originating FAX toward the destination FAX. In step S301, whether the line is connected to the destination FAX or not is checked. If the connection is successful, a normal terminal-to-terminal communication is carried out in step S303. Whereas if not successful, there is made a FAX communication transfer to the FAX mail apparatus 1 in step S302.

Referring back to FIG. 3, in first step S101 after the start, it is checked whether or not this FAX communication directly arrives at the FAX mail apparatus from the call originating FAX. This checking is conducted based on whether or not the call originating FAX dials a telephone number of the relevant FAX mail apparatus 1 ((1) in FIG. 8). Then, if the FAX communication directly arrives at the FAX mail apparatus, it is considered that the FAX communication is accompanied by a request for the FAX mail service, and hence the processing proceeds to step S102. Whereas if the FAX communication does not directly arrive at the FAX mail apparatus 1, whether or not the switching equipment transfers this FAX communication is checked in step S115. This checking is effected based on whether or not the call originating FAX dials a telephone number other than the telephone number of the FAX mail apparatus 1. Then, when the switching equipment has transferred the FAX communication, it is considered that this implies the busy intercepting service or the unattended intercepting service, and, therefore, the processing proceeds to step S116.

Figure 9:
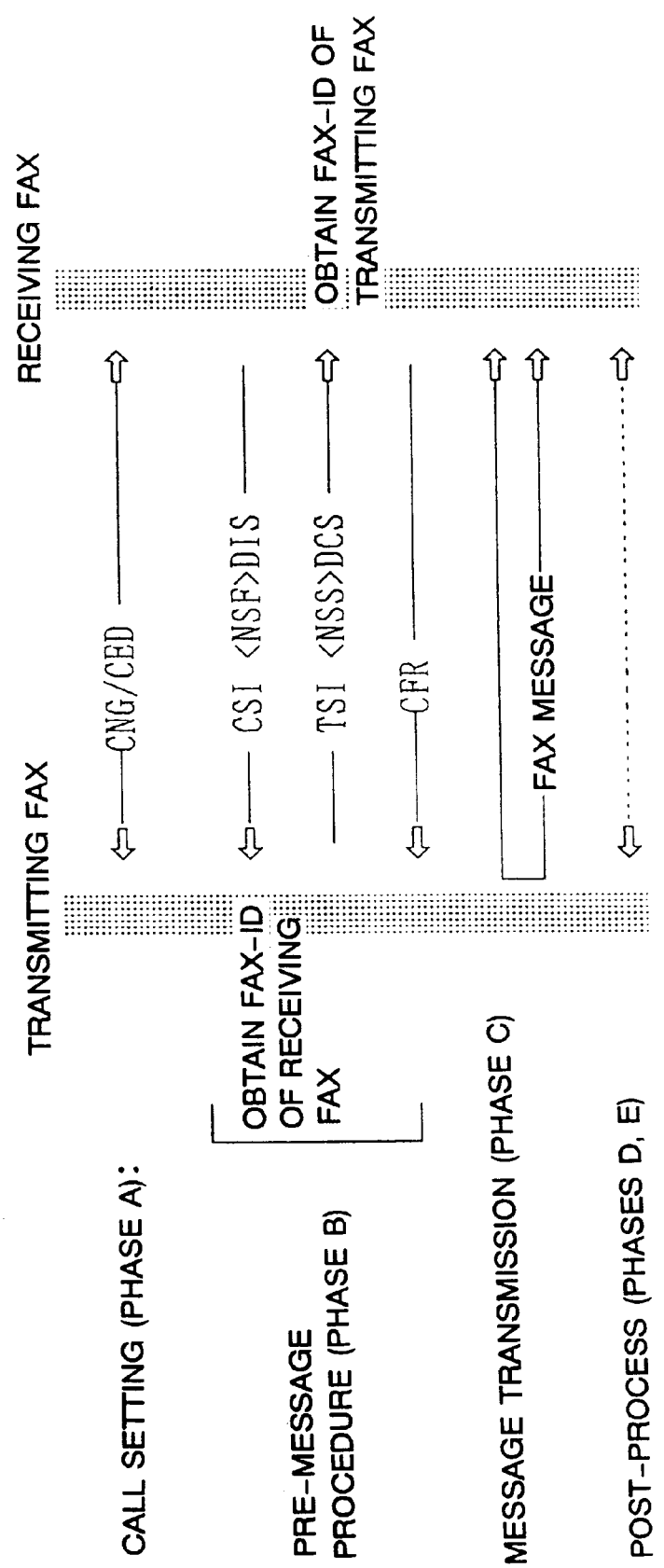
FIG. 9 is a time arrow diagram showing how the signal is transferred and received between a transmitting-side FAX and a receiving-side FAX according to a G3 FAX communication protocol.

In step S102, a service designation ((2) in FIG. 9) through the PB signal is received. In step S103 executed simultaneously therewith, a mail accept process is carried out. That is, it is checked whether or not a combination of the password and subscriber's ID contained in the service designation is registered in the service subscriber table 7. If registered, for example, a charge is imposed on a corresponding subscriber. Whereas if not registered, the processing is directly ended.

In next step S104, the service subscriber table 7 is retrieved by use of the destination designating code (that is, a telephone number of the destination FAX or a broadcasting list number) contained in the PB signal, thereby obtaining a FAX-ID of the destination FAX (when the destination designating code is the telephone number) or a name of broadcasting list and telephone numbers of a destination FAXes of a broadcasting group (when the destination designating code is the broadcasting list number) (corresponding to a retrieving element). If the destination FAX does not subscribe to the FAX mail service, however, the FAX-ID thereof is not registered, and hence the processing proceeds directly to next step S105.

Registered in the delivery management table 5 in next step S105 is the telephone number (the destination designating code) of the destination FAX that is contained in the PB signal or the telephone number group obtained in step S104.

Registered in the delivery management table 5 in subsequent step S106 is the service code (including the designated time in the time designated service but the password of the destination FAX in the confidential service) contained in the PB signal.

Figure 8:
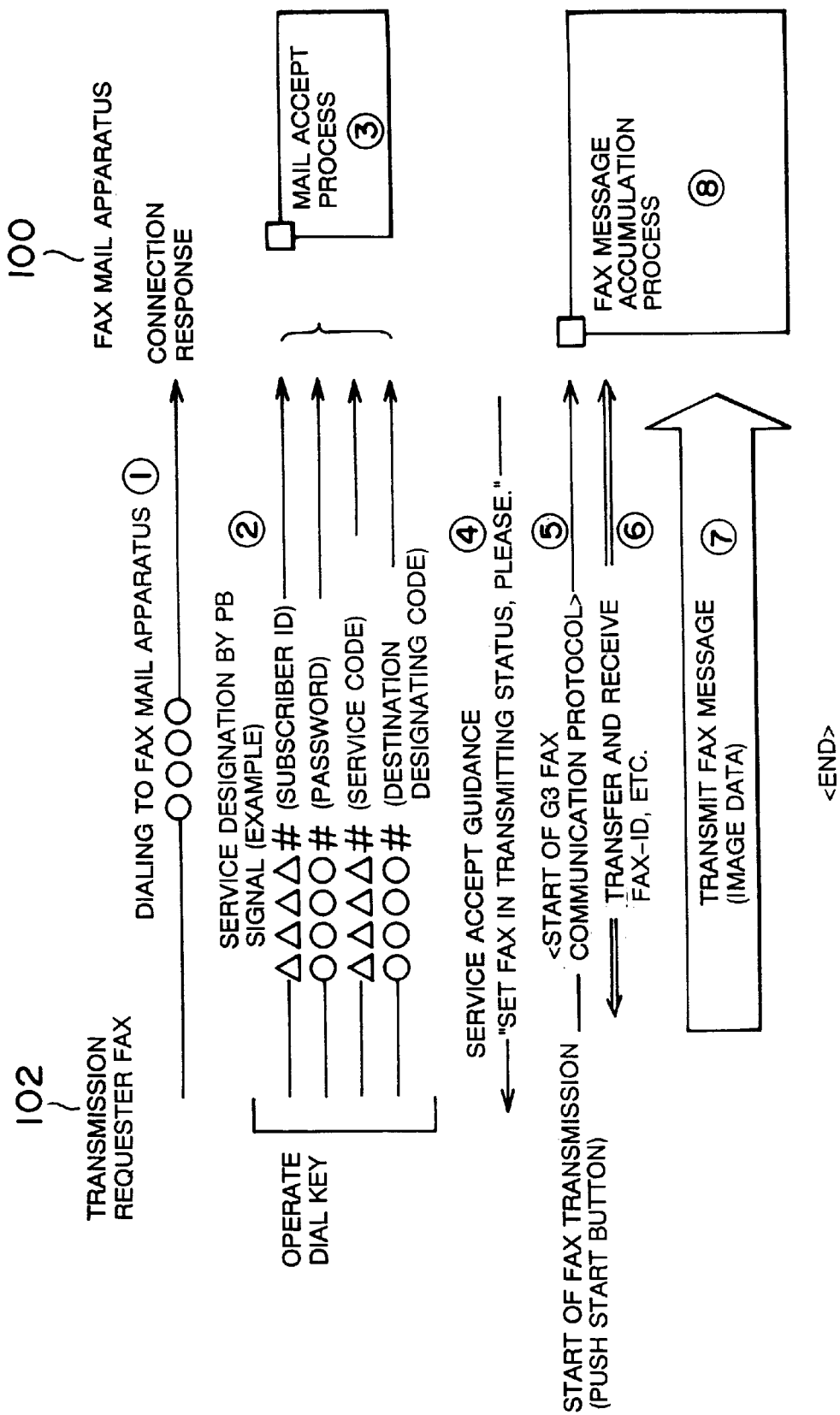
FIG. 8 is a time arrow diagram showing how a signal is transferred and received between a call originating FAX and the FAX mail apparatus when a FAX mail service is offered.

In next step S107, an instruction for transmitting a service accept guidance ((4) in FIG. 8) is given to the FAX communication unit 3. Thereafter, the processing proceeds to step S108.

On the other hand, in step S116, the dialed telephone number of the destination FAX is received.

In next step S117, the service subscriber table 7 is retrieved, thereby the service control unit 2 obtains the FAX-ID of the destination FAX (corresponding to the retrieving element). If the destination FAX does not subscribe to the FAX mail service, however, the processing proceeds directly to next step S118.

In next step S118, an instruction for starting the G3 FAX communication protocol is given to the FAX receiving unit 3. The FAX receiving unit 3, upon receiving this instruction, executes the G3 FAX communication protocol, synchronizing with the processing by the service control unit 2 ((5) in FIG. 9).

In next step S109, the sign "+" is annexed to the heads of the telephone number and of the FAX-ID (or the name of broadcasting list) of the destination FAX, and they are transmitted to the call originating FAX. The FAX receiving unit 3 transmits the FAX-ID and the telephone number as data CSI (NSF) to the call originating FAX (corresponding to a destination FAX-ID transmitting element).

Received in next step S110 is the FAX-ID of the call originating FAX that has been transmitted as data TSI (NSS) from the call originating FAX.

In subsequent step S111, the FAX-ID of the call originating FAX that has been received in step S110 is registered in the message accumulation unit 6.

In next step S112, FAX messages are received from the call originating FAX. In step S113 that is to be executed simultaneously with the step S112, the received FAX messages are sequentially accumulated in the message accumulation unit 6.

In next step S114, the service control unit 2 specifies the file name of the data file in the message accumulation unit 6 containing the FAX-ID of the transmitting FAX which has been registered in step S111 and the FAX messages which has accumulated in step S113 and registers the file name in the delivery management table 5. After the above steps, the processing in FIG. 4 is ended.

FAX Delivery Process

Figure 4:
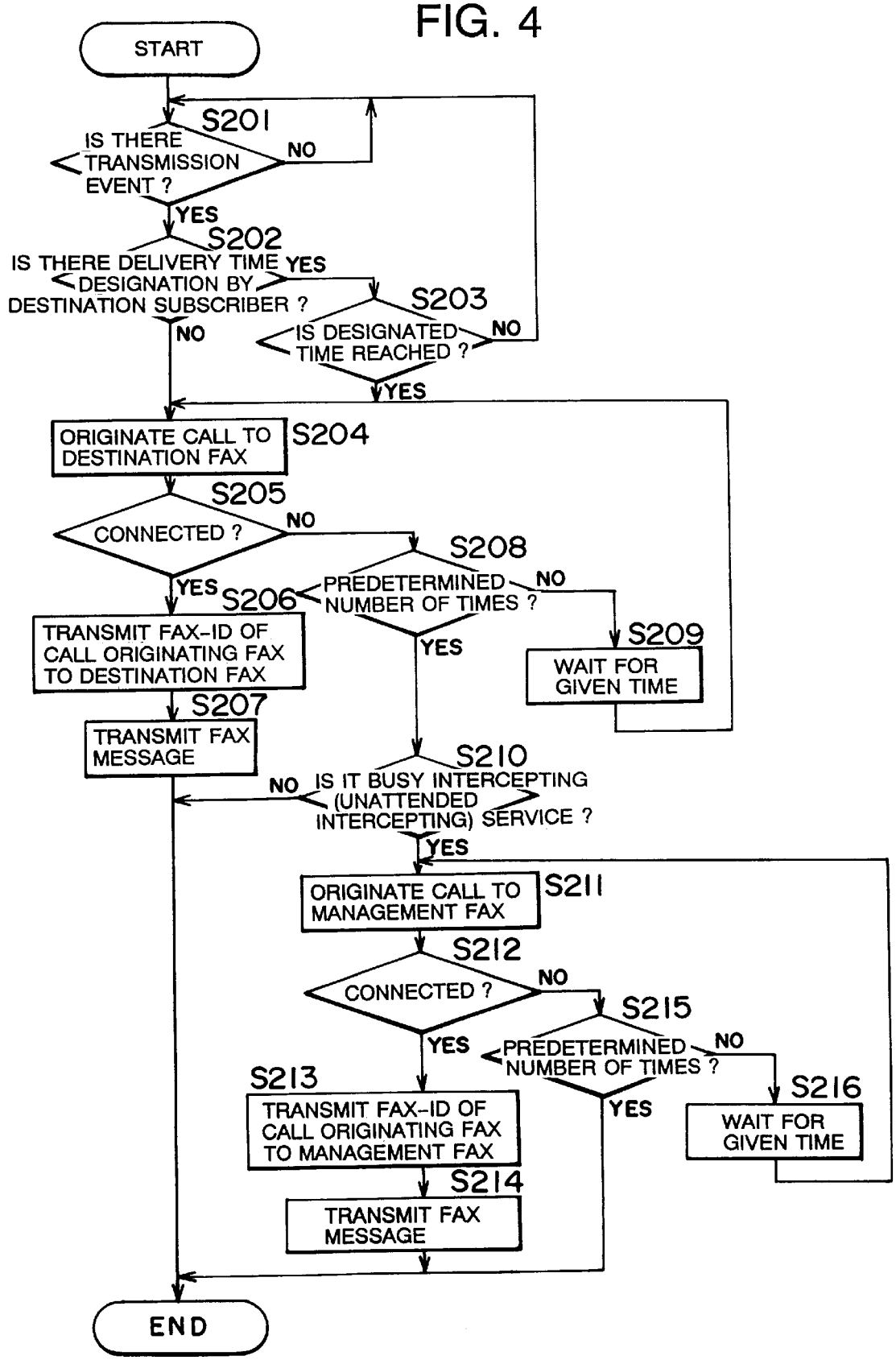
FIG. 4 is a flowchart showing a FAX transmitting process executed in a service control unit of FIG. 1.

FIG. 4 is a flowchart showing the control process executed at the time of delivering the FAX communication. The processing in the flowchart of FIG. 4 starts with switching ON the power supply of the FAX mail apparatus 1.

In first step S201 after the start, the delivery management table 5 is searched, and an occurrence of a transmission event is checked. That is, whether or not there is the FAX communication satisfying a delivery condition of a service code. If the transmission event does not occur, this checking process is repeated.

Whereas if the transmission event occurs, in step S202, the service control unit 2 checks whether or not a delivery time is designated by a destination FAX of the FAX communication where the transmission event occurs with reference to the service subscriber table 7. If the time is not designated, the processing proceeds directly to step S204. Whereas if designated, it is checked whether or not the designated time is reached in step S203. Then, if the designated time is not reached, the processing returns to step S201, wherein the service control unit 2 waits the designated time. Whereas if the designated time is reached, the processing proceeds to step S204.

In step S204, the FAX transmitting unit 4 is notified of the telephone number of the destination FAX that has been stored in the delivery management table 5, thereby originating the call to the destination FAX (corresponding to the call originating element).

In next step S205, it is checked whether or not the line is connected as a result of originating the call in step S204. Then, when the line is connected, in step S206, the service control unit 2 reads the FAX-ID of the call originating FAX from the message accumulation unit 6 on the basis of the data file name read from the delivery management table 5 and notifies the FAX-ID to the FAX transmitting unit 4 after "+" has been annexed to the head thereof. The FAX transmitting unit 4 transmits this FAX-ID as the data TSI (NSS) to the destination FAX (corresponding to a call originating FAX-ID transmitting element). In next step S207, the FAX message read from the message accumulation unit 6 is transmitted to the destination FAX. After the above steps, the processing in FIG. 4 is finished.

While on the other hand, when the line could not be connected in step S205, the service control unit 2 checks whether or not the number of the call originating without the line connected reaches a predetermined number of times in step S208. Then, it does not reach the predetermined number of times, there is a wait during a given time in step S209, and the processing goes back to step S204 in order to re-originate the call.

Whereas if it reaches the predetermined number of times, in step S210, it is checked whether or not the FAX communication is conducted for the busy intercepting service or the unattended intercepting service is checked based on the service code registered in the delivery management table 5. If conducted for neither the busy intercepting service nor the unattended intercepting service, this implies the FAX mail service, and hence the service control unit 2 finishes the process assuming that the delivery has been unsuccessful.

Whereas if conducted for the busy intercepting service or the unattended intercepting service, in step S211, the FAX transmitting unit 4 is notified of the telephone number of the management FAX, thereby originating the call to the management FAX (corresponding to the call originating element).

In next step S212, it is checked whether or not the line is connected as a consequence of originating the call in step S211. Then, if the line is connected, in step S213, the service control unit 2 reads FAX-ID of the call originating FAX from the message accumulation unit 6 on the basis of the data file name that has been read from the delivery management table 5 and then notifies the FAX-ID to the FAX transmitting unit 4. The FAX transmitting unit 4 transmits this FAX-ID as the data TSI (NSS) to the management FAX (corresponding to the call originating FAX-ID transmitting element). In next step S214, the FAX message read from the message accumulation unit 6 is transmitted to the management FAX (corresponding to the FAX message transmitting element). After the above steps, the processing in FIG. 4 is ended.

While on the other hand, when the line could not be connected in step S212, the service control unit 2 checks whether or not the number of the call originating without the line connected reaches the predetermined number of times in step S215. Then, if it does not reach the predetermined number of times, there is a wait during a given time in step S216, and the processing goes back to step S211 in order to re-originate the call.

Whereas if it reaches the predetermined number of times, a further call re-originating process is cut off, thus finishing the processing.

(Operation of FAX Mail Apparatus)

According to the FAX mail apparatus 1 in accordance with this embodiment, in any case of the FAX mail service and the busy intercepting service or the unattended intercepting service, the FAX-ID of the call originating FAX is transmitted to the destination FAX. Accordingly, the destination FAX is capable of printing the FAX message of this FAX-ID on a sheet of output paper for the FAX message and saving it in a receiving management list. Therefore, even in such a case that the user of the destination FAX manages a call originator by use of the printed FAX-ID or the receiving management list, the user can accept the service by the FAX mail apparatus 1 without any trouble in terms of the management. Further, even when the FAX communication is delivered for the busy intercepting service or the unattended intercepting service, the user of the destination FAX is capable of receiving the FAX communication without being particularly aware of an implementation of the intercepting service through the communication network (switching equipment) and the FAX mail apparatus 1. Note that if the FAX communication is delivered via the FAX mail apparatus 1, the sign "+" is annexed to the head of the FAX-ID of the call originating FAX in this embodiment. Accordingly, the user of the destination FAX is able of know the delivery conducted as the FAX mail service.

Further, in the case the FAX mail apparatus 1 tried to originate the call to the destination FAX the predetermined number of times for the busy intercepting service or the unattended intercepting service without success in connection of line to the FAX, the unreached FAX communication is delivered to the management FAX. In this case also, however, the FAX-ID of the call originating FAX is transmitted to the management FAX and then printed on the output paper. Hence, even if the FAX message has nothing written about the call originator, the call originating FAX can be easily specified.

Accordingly, it is feasible to relieve a load of the operation management work to send back the output paper to the call originator through off-line.

On the other hand, according to the FAX mail apparatus 1 in this embodiment, in any case of the FAX mail service and the busy intercepting service or the unattended intercepting service, as far as the destination FAX is registered as a service subscriber in the FAX mail apparatus 1, the FAX-ID thereof is to be transmitted to the call originating FAX (if not registered, the telephone number of the destination FAX is sent back instead of the FAX-ID). Accordingly, the FAX-ID or the telephone number thereof can be displayed on the display unit (LCD) of the call originating FAX, and, therefore, the call originator is capable of confirming a correct or incorrect of the input destination designating code or the dial. Further, even in such a case that the FAX mail apparatus 1 receives the FAX communication for the busy intercepting service or the unattended intercepting service, the call originator is capable of transmitting the FAX communication without being particularly aware of the implementation of the intercepting service through the communication network (switching equipment) and the FAX mail apparatus 1. Note that if the FAX mail apparatus 1 receives the FAX communication as the FAX mail service, the sign "+" is annexed to the head of the destination FAX-ID. Accordingly, the call originator is able to recognize that the FAX communication has been received by the FAX mail apparatus 1.

When the call originator requests the broadcasting service, the broadcasting list number for specifying a broadcasting group is transmitted as a destination designating code to the FAX mail apparatus 1. The FAX mail apparatus 1, replies the name of the broadcasting list as a FAX-ID of the destination FAXes corresponding to the list number to the call originating FAX. Accordingly, the call originator is capable of easily recognizing whether the destination designating code is correct or not. In this case, all the telephone numbers or the FAX-IDs of the individual destination FAXes constituting the broadcasting group may be replied together with the name of the broadcasting list to the call originating FAX. When replied in this way, the call originator is capable of, even when forgetting a content of the broadcasting list, knowing the destination FAX which is to be actually delivered.

EXAMPLE 1

An example 1 which will be discussed next shows an example of implementing the time designated service by use of the FAX mail apparatus 1 in accordance with the present embodiment.

Now, as illustrated in FIG. 6, a call originating FAX 10 in a terminal address A is previously registered in the service subscriber table 7, wherein a FAX-ID thereof is "aaaa", and a telephone number thereof is "YYYY".

Further, a call receiving FAX 13 in a terminal address B is previously registered in the service subscriber table 7, wherein a FAX-ID thereof is "bbbb", and a telephone number thereof is "XXXX".

Then, it is assumed that the call originator originates a call to the FAX mail apparatus 1 by use of the call originating FAX 10, requests it for the time designated service (service code) in which a designated time is 10:00 and inputs a destination telephone number "XXXX" as a destination designating code.

Hereupon, this service code and the destination telephone number are registered in the delivery management table 5((a), (b)), and the service subscriber table 7 is retrieved based on this destination telephone number "XXXX". Then, the FAX-ID "bbbb" in the terminal address B corresponding to this telephone number "XXXX" is read ((c)). The thus read FAX-ID "bbbb" is annexed with "+" and sent back to the call originating terminal 10 ((d)).

In the call originating terminal 10 receiving the reply of this FAX-ID "+bbbb", this FAX-ID "+bbbb" is displayed on a display unit 11 thereof. Accordingly, the call originator is capable of confirming a location where the destination FAX 13 is installed or a name of subscriber using the destination FAX 13. The call originator is also able to confirm a status where the call origination is accepted by the FAX mail apparatus 1.

When the call originating FAX 10 transmits its FAX-ID "aaaa" to the FAX mail apparatus 1 in response to receiving the destination FAX-ID, the FAX-ID "aaaa" is stored in the message accumulation unit 6 ((e)).

Thereafter, a FAX copy 12 is read by the call originating FAX 10, and FAX message coded data corresponding to an image on the FAX copy 12 is transmitted to the FAX mail apparatus 1. In the FAX mail apparatus 1, this item of FAX message coded data is stored in the message accumulation unit 6 ((f)). In this message accumulation unit 6, the delivery management table 5 registers a file name "zzzz" of the data file for storing the FAX-ID "aaaa" and the FAX message coded data ((g)).

When the time becomes 10:00 after completing such a registration, the call is originated to the destination FAX 13 in accordance with the destination telephone number in the delivery management table 5. Then, the FAX-ID "aaaa" of the destination FAX is read from the message accumulation unit 6 on the basis of the data file name in the delivery management table 5 and transmitted to the destination FAX 13 after the sign "+" has been annexed to the head thereof ((h)). Thereafter, the FAX message coded data is read from the message accumulation unit 6 and then transmitted to the destination FAX 13 ((i)).

In the destination FAX 13 receiving those items of data, there is outputted the FAX message output paper printed with the FAX-ID "+aaaa" of the call originating FAX 10 at an upper edge thereof. Accordingly, the user of the destination FAX is capable of recognizing the location where the call originating FAX 10 is installed or the name of subscriber using the call originating FAX 10 and also the status of being delivered by the FAX mail apparatus 1.

EXAMPLE 2

An example 2 which will hereinafter be discussed shows an example of implementing the busy intercepting service by use of the FAX mail apparatus 1 in accordance with the present embodiment.

Figure 7:
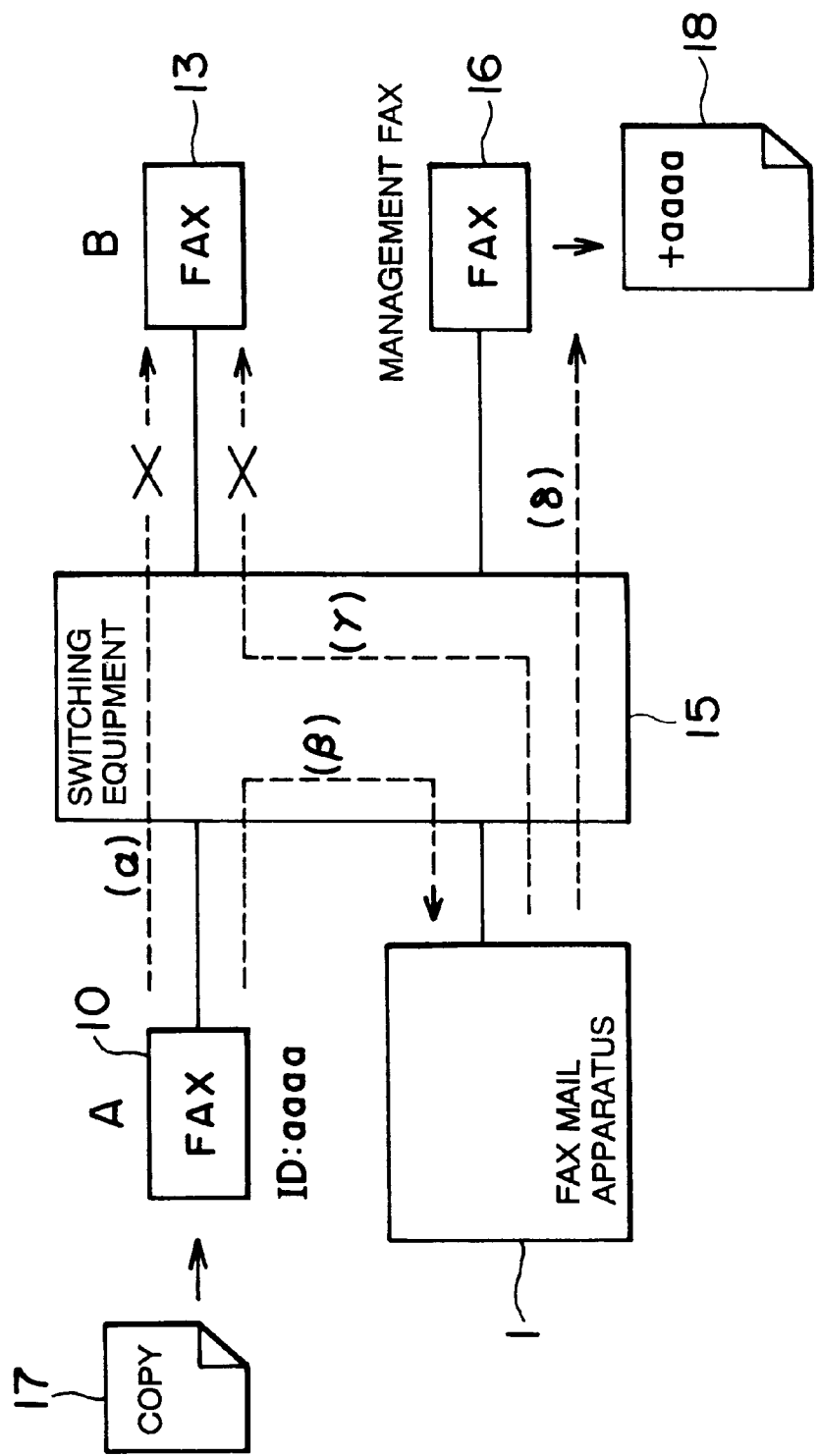
FIG. 7 is an explanatory diagram showing a second example of the FAX transmission using the FAX mail apparatus of FIG. 1.

Now, as illustrated in FIG. 7, it is assumed that there is a FAX communication to send a copy 17 toward the destination FAX 13 in the terminal address B from the call originating FAX 10 in the terminal address A (($\alpha$)). A switching equipment 15, when detecting that the line for this FAX communication is not connected because of the destination FAX 13 being busy, transfers the call originated from the call originating FAX 10 to the FAX mail apparatus 1. The FAX mail apparatus 1 receiving the transfer is notified of the FAX-ID "aaaa" from the call originating FAX 10 and receives a FAX message in which the FAX copy 17 is coded ((β)).

The FAX mail apparatus 1 tries to originate the call to the destination FAX 13 after a predetermined time has elapsed ((γ)). Then, if the line is not connected even by trying to re-originate the call a predetermined number of times at intervals of the predetermined time, the FAX mail apparatus 1 originates the call to a management FAX 16 ((6)). At this time, the FAX mail apparatus 1 annexes the "+" to the head of the FAX-ID "aaaa" received from the call originating FAX 10 together with the FAX message and notifies the management FAX 16 of it, and, therefore, this FAX-ID "+aaaa" is displayed at the upper edge on a sheet of output paper 18 outputted from the management FAX 16. Consequently, the operator of the management FAX 16 sends back this output paper to the call originator identified by FAX-ID "+aaaa" and is capable of thus informing the call originator of the fact that the FAX message is not yet reached.

According to the thus constructed FAX mail apparatus in the first aspect of the present invention, when the FAX message received from the call originating FAX is delivered to the destination FAX, the FAX-ID of the call originating FAX can be transmitted to the destination FAX.

Further according to the FAX mail apparatus in the second aspect of the present invention, when receiving the FAX message destined to other FAX from the call originating FAX, the FAX mail apparatus can transmit FAX-ID of the FAX to which this FAX message is destined to the call originating FAX.

Still further, according to the FAX mail apparatus in the third aspect of the present invention, when delivering the FAX message received from the call originating FAX to the management FAX, the FAX-ID of the call originating FAX can be transmitted to the management FAX.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A FAX mail apparatus, connected to a communication network, temporarily receiving, if a line is not connected within the communication network for a call of a FAX communication to transmit a FAX message from a call originating FAX to a destination FAX, the FAX message from said call originating FAX through a line connected within the communication network between the call originating FAX and the FAX mail apparatus and transmitting the FAX message to said destination FAX after a predetermined time has elapsed through a line connected within the communication network between the FAX mail apparatus and the destination FAX, said apparatus comprising:

a call originating FAX-ID storage unit for storing a FAX-ID of said call originating FAX which has been transmitted as data from said call originating FAX, said FAX-ID being set in said call originating FAX;

call originating means for originating a call to transmit the FAX message to said destination FAX after a given time has elapsed since the FAX message was received and, if the line is not connected to said destination FAX as a result of this call originating process, originating the call to transmit the FAX message to a management FAX being a terminating FAX apparatus;

FAX message transmitting means for transmitting, if the line is connected to said management FAX as a result of the call originating process by said call originating means, the FAX message to said management FAX; and call originating FAX-ID transmitting means for transmitting with the FAX message, if the line is connected to said management FAX as a result of the call originating process by said call originating means, the FAX-ID of said call originating FAX which has been stored in said call originating FAX-ID storage unit to said management FAX instead of a FAX-ID of the FAX mail apparatus itself.

2. A FAX mail apparatus according to claim 1, wherein said originating FAX-ID is indicated together with the FAX message on said destination FAX.

\* \* \* \* \*